United States Patent
Joseph et al.

(10) Patent No.: US 9,917,999 B2
(45) Date of Patent: Mar. 13, 2018

(54) SYSTEM AND METHOD FOR CAPTURING MULTI-MEDIA OF AN AREA OF INTEREST USING MULTI-MEDIA CAPTURING DEVICES

(71) Applicant: Wipro Limited, Bangalore (IN)

(72) Inventors: Sudheesh Joseph, Kochi (IN); Tomson Ganapathiplackal George, Palka (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 15/075,322

(22) Filed: Mar. 21, 2016

(65) Prior Publication Data

US 2017/0264809 A1    Sep. 14, 2017

(30) Foreign Application Priority Data

Mar. 9, 2016 (IN) .............................. 201641008274

(51) Int. Cl.
*H04N 5/232* (2006.01)
*G06K 9/20* (2006.01)
(Continued)

(52) U.S. Cl.
CPC ....... *H04N 5/23203* (2013.01); *G06K 9/2081* (2013.01); *G06K 9/3233* (2013.01);
(Continued)

(58) Field of Classification Search
None
See application file for complete search history.

(56) References Cited

U.S. PATENT DOCUMENTS 6,850,265 B1    2/2005  Strubbe et al.
2003/0074671 A1    4/2003  Murakami et al.
(Continued)

FOREIGN PATENT DOCUMENTS

EP    2 259 577    12/2010
EP    2 457 494    5/2012
WO    WO 2014/005301    1/2014

OTHER PUBLICATIONS

European Search Report dated Dec. 20, 2016 in European Patent Office in counterpart European Patent No. Application 16176964.1 10 pages.
(Continued)

*Primary Examiner* — Stephen Coleman
(74) *Attorney, Agent, or Firm* — Finnegan, Henderson, Farabow, Garrett & Dunner, LLP

(57) ABSTRACT

The present disclosure relates to a method and device for capturing multi-media of an area of interest in plurality of areas using plurality of multi-media capturing devices. The method comprises receiving feeds from each of plurality of multi-media capturing devices and analyzing the feeds to obtain one or more multi-media parameters associated with the plurality of areas. The feeds comprise speech data and at least one of gaze data, dynamics data and gesture data of corresponding plurality of areas. Upon analyzing, interest index is determined for each of the plurality of areas based on the one or more multi-media parameters, weightage parameters and time parameter. Based on the interest index, the area of interest is identified from the plurality of areas for capturing the multi-media of the area of interest.

12 Claims, 8 Drawing Sheets

(51) Int. Cl.
  *G06K 9/32* (2006.01)
  *H04R 1/32* (2006.01)
  *H04N 21/422* (2011.01)
  *H04N 21/4223* (2011.01)
  *H04N 21/439* (2011.01)
  *H04N 21/442* (2011.01)
  *H04N 21/462* (2011.01)
  *H04N 21/4728* (2011.01)

(52) U.S. Cl.
  CPC ... *H04N 21/4223* (2013.01); *H04N 21/42201* (2013.01); *H04N 21/42203* (2013.01); *H04N 21/439* (2013.01); *H04N 21/44218* (2013.01); *H04N 21/4622* (2013.01); *H04N 21/4728* (2013.01); *H04R 1/326* (2013.01)

(56) References Cited

U.S. PATENT DOCUMENTS

| | | |
|---|---|---|
| 2008/0117313 A1 | 5/2008 | Voorhees |
| 2014/0028550 A1 | 1/2014 | Adhikari |
| 2014/0063237 A1* | 3/2014 | Stone ............... H04N 7/181 348/143 |
| 2014/0237495 A1 | 8/2014 | Jang et al. |
| 2014/0379485 A1 | 12/2014 | Goswami et al. |
| 2015/0172541 A1 | 6/2015 | Anderson |

OTHER PUBLICATIONS

Ranjan et al., "Automatic camera control using unobtrusive vision and audio tracking": *Graphics Interface Conference 2010*, May 31-Jun. 2, 2010 pp. 47-54.

* cited by examiner

SYSTEM AND METHOD FOR CAPTURING MULTI-MEDIA OF AN AREA OF INTEREST USING MULTI-MEDIA CAPTURING DEVICES

FIELD OF THE DISCLOSURE

The present subject matter generally relates to multi-media capturing systems. More particularly, but not exclusively, the present disclosure discloses a method and a unit for capturing multi-media of an area of interest in plurality of areas using plurality of multi-media capturing devices.

BACKGROUND

Multi-media such as images, videos and audios are captured by one or more multi-media capturing devices. The multi-media capturing devices may include a camera, a video recorder, a microphone and any such devices. For example, if a video of a large area is to be captured, plurality of multi-media capturing devices, for example cameras and microphones, are spread across the large area such that the video of each region of the large area is captured. Sometimes, few areas in the large area are given more priority, and accordingly the video of the prioritized area is captured. In such systems, there may be a need for a human to operate the plurality of multi-media capturing devices in order to obtain the required multi-media in the large area. One or more existing techniques provide an automated method for capturing multi-media such as a video or an audio in an area using plurality of multi-media capturing devices. One of the existing techniques may trace moving objects and capture the multi-media of the objects using one or more multi-media capturing devices. One of the existing techniques detects voice, gesture and gaze of persons in an area and may capture the multi-media of persons. However, systems with existing techniques may require a human intervention for operating the capturing devices. Some of the systems with the existing techniques may not be configured to obtain activities data of the entire area for capturing the multi-media of area of interest. Thereby the systems may not be able to efficiently capture important area of interest at right time.

SUMMARY

Disclosed herein is a method for capturing multi-media of an area of interest in plurality of areas using plurality of multi-media capturing devices. The method comprises receiving feeds from each of plurality of multi-media capturing devices and analyzing the feeds to obtain one or more multi-media parameters associated with the plurality of areas. The feeds comprise speech data and at least one of gaze data, dynamics data and gesture data of corresponding plurality of areas. Upon analyzing, interest index is determined for each of the plurality of areas based on the one or more multi-media parameters, weightage parameters and time parameter. Based on the interest index, the area of interest is identified from the plurality of areas for capturing the multi-media of the area of interest.

In an embodiment, the present disclosure relates to a multi-media capturing control unit for capturing multi-media of an area of interest in plurality of areas using plurality of multi-media capturing devices. The multi-media capturing control unit comprises a processor and a memory communicatively coupled to the processor. The memory stores processor-executable instructions which on execution cause the processor to receive feeds from each of plurality of multi-media capturing devices and analyze the feeds to obtain one or more multi-media parameters associated with the plurality of areas. Here, the feeds comprise speech data and at least one of gaze data, dynamics data and gesture data of corresponding plurality of areas. Upon obtaining the one or more multi-media parameters, interest index for each of the plurality of areas of interest is determined based on the one or more multi-media parameters, weightage parameters and time parameter. Based on the determined interest index, an area of interest from the plurality of areas is identified for capturing the multi-media of the area of interest.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1A:
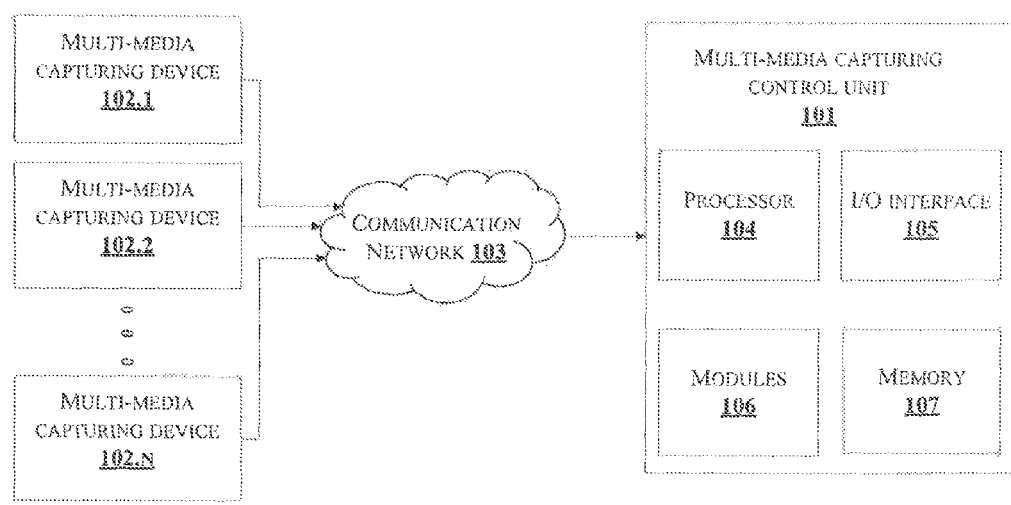
FIGS. 1a and 1b illustrates an exemplary system for capturing multi-media of an area of interest in plurality of areas using plurality of multi-media capturing devices in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to an automated multi-media capturing system comprising multi-media capturing devices and a control unit. The system is configured for determining an area of interest which may be prime focus area in a large area and capturing the multi-media of that area of interest using the multi-media capturing devices. The system automatically selects the multi-media capturing device and changes settings of features such as focus settings, zoom level settings and so on based on parameters associated with the area and multi-media capturing devices. Initially, feeds from each of multi-media capturing devices are received and analyzed to obtain one or more multi-media parameters associated with the plurality of areas. Upon obtaining one or more multi-media parameters, interest index for each of the plurality of areas is determined based on the one or more multi-media parameters, weightage parameters and time parameter. Further based on the interest index, the area of interest is identified in the plurality of areas and the multi-media of the identified area of interest are captured using corresponding multi-media capturing devices.

Figure 1B:
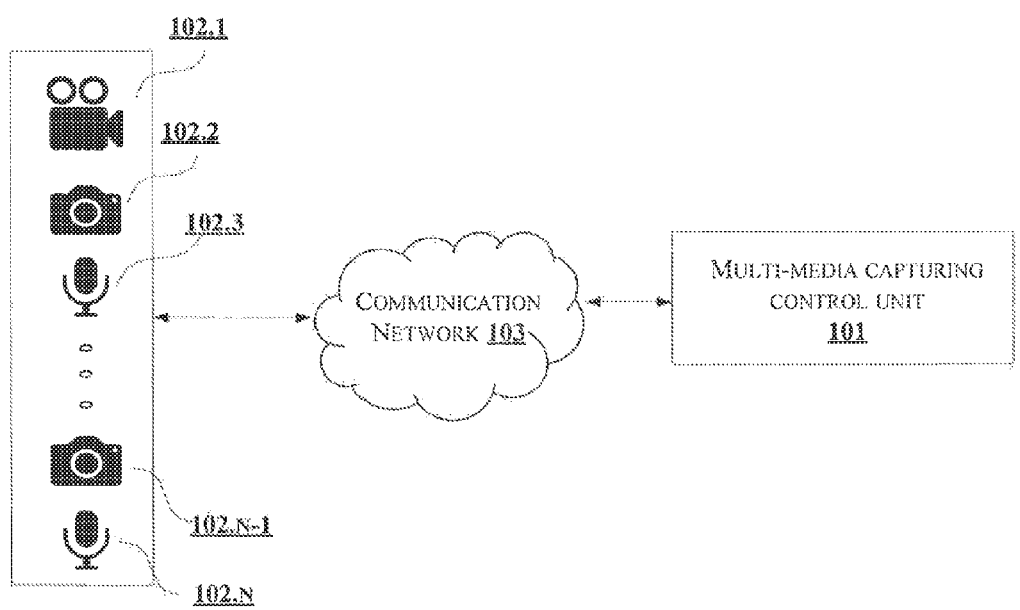

FIGS. 1a and 1b illustrates an exemplary system for capturing multi-media of an area of interest in plurality of areas using plurality of multi-media capturing devices in accordance with some embodiments of the present disclosure.

The exemplary system comprises of a multi-media capturing control unit 101, plurality of multi-media capturing devices 102.1-102.N (hereafter referred to as plurality of multi-media capturing devices 102) and communication network 103. The multi-media capturing control unit 101 comprises a processor 104, an Input/Output (I/O) interface 105, modules 106 and a memory 107. The memory 107 in the multi-media capturing control unit 101 is communicatively coupled to the processor 104. The memory 107 stores processor executable instructions which on execution help the multi-media capturing control unit 101 to capture multi-media of the area of interest.

In one implementation, the multi-media capturing control unit 101 may be implemented in a variety of computing systems, such as a laptop computer, a desktop computer, a Personal Computer (PC), a notebook, a smartphone, a tablet, e-book readers (e.g., Kindles and Nooks), a server, a network server, and the like.

Initially, for capturing multi-media of the area of interest, feeds from each of plurality of multi-media capturing devices 102 are received via the communication network 103. The plurality of multi-media capturing devices 102 may be image capturing devices, video capturing devices and audio capturing devices as shown in FIG. 1b. After receiving the feeds, the feeds are analyzed by the multi-media capturing control unit 101, to obtain one or more multi-media parameters associated with the plurality of areas. The feeds comprise speech data and at least one of gaze data, dynamics data and gesture data of corresponding plurality of areas. Upon obtaining one or more multi-media parameters from the feeds, interest index for each of the plurality of areas is determined by the multi-media capturing control unit 101, based on the one or more multi-media parameters, weightage parameters and time parameter. The weightage parameters comprise area weightage, audio weightage, video weightage and dynamics weightage of each of the plurality of areas and the weightage parameters are pre-set with corresponding weightage values. The one or more multi-media parameters comprises video activity parameter, audio activity parameter, gaze directed parameter, directional phrase parameter and directional gesture parameters of each of the plurality of areas. The time parameter is a time duration for which the multimedia is captured. Here, the time duration is inversely proportional to the interest index when the video activity parameter and the audio activity parameter are lesser than a pre-defined threshold value. In one embodiment, the time parameter may be a predefined value. Based on the interest index, an area of interest from the plurality of areas is identified by the multi-media capturing control unit 101 and the multi-media of the identified area of interest are captured using corresponding plurality of multi-media capturing devices 102. Here, the interest index of the identified area of interest is greater than the interest index of other plurality of areas. In one embodiment, one or more features and orientation of the corresponding plurality of multi-media capturing devices 102 is changed for capturing the multi-media.

The multi-media capturing control unit 101 receives data such as the feeds and other associated data for capturing multi-media via the communication network 103 through the I/O interface 105 of the multi-media capturing control unit 101. The multi-media capturing control unit 101 may receive the data from at least one of the plurality of multi-media capturing devices 102. Also, the multi-media capturing control unit 101 provides output via the I/O interface 105 to the multi-media capturing devices 102 through the communication network 103. In one embodiment, the output may be provided to a display unit (not shown in Figure). In one embodiment, the received data and the output may be stored in the memory 107. Further, the I/O interface 105 is coupled with the processor 104 of the multi-media capturing control unit 101.

In one embodiment, the data may be received by the multi-media capturing control unit 101 in form of data packets. In one embodiment, the communication network 103 in the system is configured to be in listening mode and accept the data packets. In a non-limiting embodiment, the multi-media capturing control unit 101 decodes the received data packets as one of General Packet Radio Service (GPRS) packets, Building Automation and Controls Network (BACnet) packets, Open Building Information Exchange (OBiX) files, File Transfer Protocol (FTP) files and others associated with the data packets.

Figure 2:
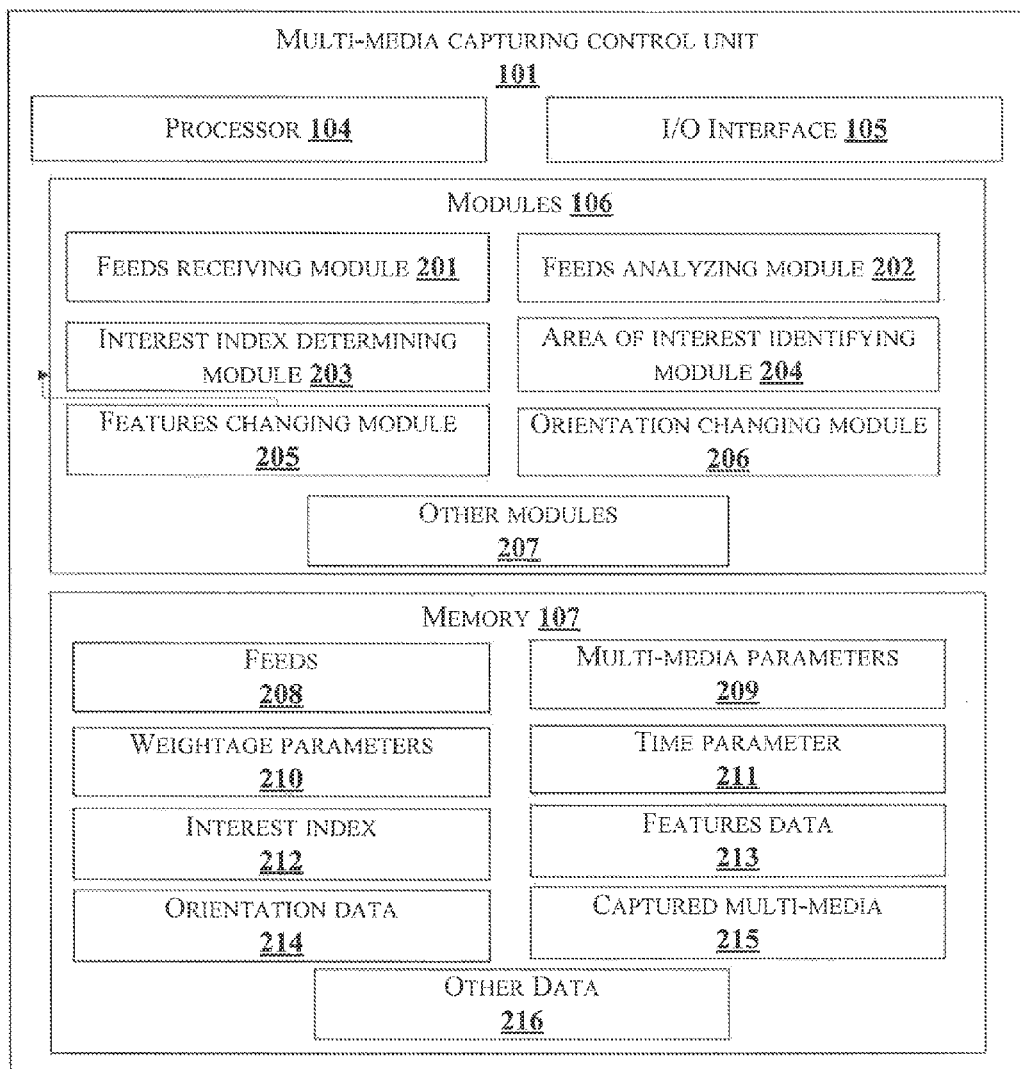
FIG. 2 illustrates a detailed block diagram of an exemplary multi-media capturing control unit with various data and modules for capturing multi-media of an area of interest in plurality of areas using plurality of multi-media capturing devices in accordance with some embodiments of the present disclosure.

FIG. 2 illustrates a detailed block diagram of an exemplary multi-media capturing control unit with various data and modules for capturing multi-media of an area of interest in plurality of areas using plurality of multi-media capturing devices in accordance with some embodiments of the present disclosure In the illustrated FIG. 2, the one or more data in the memory 107 and the one or more modules 106 are described herein in detail.

In an embodiment, the one or more data in the memory 107 are processed by the one or more modules 106 of the multi-media capturing control unit 101. In one embodiment, the one or more modules 106 may be stored within the memory 107 (not shown in Figure). In an example, the one or more modules 106, communicatively coupled to the processor 104, may also be coupled to the memory 107 and implemented as hardware. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure invention will result in a novel hardware.

In one implementation, the one or more modules 106 may include, for example, a feeds receiving module 201, a feeds analyzing module 202, an interest index determining module 203, an area of interest identifying module 204, a features changing module 205, orientation changing module 206 and other modules 207 associated with the multi-media capturing control unit 101.

In one embodiment, the one or more data in the memory 107 may include, for example, feeds 208, multi-media parameters 209, weightage parameters 210, time parameter 211, interest index 212, features data 213, orientation data 214, captured multi-media 215 and other data 216 for capturing multi-media of the area of interest. In one embodiment, the feeds 208, may be received by the multi-media capturing control unit 101 in real-time for capturing the multi-media of the area of interest.

The feeds receiving module 201 in the multi-media capturing control unit 101 receives feeds 208 from the plurality of multi-media capturing devices 102. The feeds 208 include but are not limited to the speech data, gaze data, dynamics data and gesture data. The multi-media capturing devices 102 may be a video capturing device, an image capturing device and an audio capturing device as shown in FIG. 1b. The multi-media capturing device may be spread across the plurality of areas for capturing the multi-media. In one embodiment, the plurality of multi-media devices 102 may be cameras which are optical instruments configured for capturing and recording data such as images and videos. The data may be at least stored locally in the camera and transmitted to other storage devices. The present disclosure may be implemented with plurality of cameras. In one embodiment, a robotic camera mount is implemented which comprises 360 degree rotation capabilities as well as lateral movements. The multi-media capturing control unit 101 provides control signals to the cameras to change orientation as required for capturing the multi-media of the area of interest. In another embodiment, the multi-media capturing devices 102 may be one or more microphones configured to capture audio in the plurality of areas. In another embodiment, both cameras and microphones are spread across the plurality of areas to obtain the gesture data, the gaze data, the dynamics data, and the speech data. The gesture data, the gaze data and the dynamics data may be obtained from the cameras and the speech data may be obtained from the microphones. Also, location data of each of the plurality of multi-media capturing devices is obtained along with the feeds from the plurality of the multi-media capturing devices. In one embodiment, the location data of each of the plurality of multi-media capturing devices may be stored in the memory 107 and obtained from the memory 107. The gesture data comprises detection of gesture of one or more persons in the plurality of areas. The gaze data comprises direction of sight or gaze of the one or more persons, towards a particular direction in the plurality of areas. The dynamics data relates to motion of one or more objects, which may also be the one or more persons, in the plurality of areas. The speech data comprises direction of the speech and attention drawing statements spoken by the one or more persons. The attention drawing statements may include, but are not limited to, "look here", "as you can see in the presentation screen", as the graphical data on screens shows" and so on. Along with the feeds 208, video multi-media and audio multi-media are also obtained from the corresponding plurality of multi-media capturing devices 102. In one embodiment, the feeds 208 are obtained in real-time from the multi-media capturing devices 102.

The feeds analyzing module 202 analyses the feeds 208 obtained from the plurality of multi-media capturing devices 102 to obtain the one or more multi-media parameters 209. The one or more multi-media parameters 209 comprises the Video Activity Parameter (VAP), the Audio Activity Parameter (AAP), the Gaze Directed Parameter (GDP), the Directional Phrase Parameter (DPP) and the Directional Gesture Parameter (DGP) of each of the plurality of areas. The VAP may be a numeric value proportionate to motion levels detected in the plurality of areas which is derived by analyzing at least one of the gaze data, the gesture data and the dynamics data. The AAP may be a numeric value proportionate to audio activity level detected in the plurality of areas which may be derived from the speech data. The GDP may be a numeric value proportional to number distinctive human gazes directed to an area which may be derived from the gaze data. The DPP may be a numeric value proportional to number of distinct directional speech phrases pointed to an area derived from the speech data in the plurality of areas. The DGP may be a numeric value proportional to number of distinct directional gestures made or pointed to an area which may be derived from the gesture data in the plurality of areas.

The interest index determining module 203 determines the interest index 212 for each of the plurality of areas based on the one or more multi-media parameters 209, the weightage parameters 210 and the time parameter 211. As described above, the one or more multi-media parameters 209 comprise VAP, AAP, GDP, DPP and DGP. The weightage parameters 210 include the Area Weightage (ArW), the Audio Weightage (AuW), the Video Weightage (VW) and the Dynamics Weightage (DVW). The weightage parameters 210 are pre-set with corresponding weightage value by the user. In one embodiment, the weightage parameters 210 are pre-set by the multi-media capturing control unit 101 based on user's configurations relating to the plurality of areas. The user may provide higher weightage values to desired plurality of areas. For example, consider a scenario where a presentation is to be provided by a presenter. The user may configure presentation area and dais area with higher weightage values. In one embodiment, the configuration may be in form of at least one of co-ordinates and individual camera positions. The video activities and the audio activities detected in areas with higher weightage values are given a higher audio weightage value and a higher video weightage values. The ArW may be preset numerical weightage assigned to each of the plurality of areas. The AuW may be preset numerical weightage assigned to the audio activity originating from each of the plurality of areas. The ArW may be preset numerical weightage assigned to motion detected in each of the plurality of areas. The DW may be preset numerical value that is used to increase dynamics of active frames from the multi-media capturing devices 102. In one embodiment, if the preset value of DW is higher, more changes are made to the features and the orientation of multi-media capturing devices 102. In one embodiment, the weightage parameters 210 and one or more multi-media parameters 209 are pre-set by the user. The user configures one or more of the plurality of areas by providing the weightage values to the weightage parameters associated with the one or more of the plurality of the areas. Other plurality of areas may be other areas which may not be configured by the user.

Upon obtaining the one or more multi-media parameters 209 and the weightage parameters 210, a combined parameter for the video activities and the audio activities is derived. Consider a scenario where a user configures an area A and other area is G. The combined parameter for audio activities (CPA) may be provided as in equation 1.

$$CPA = ((AAP)*(AuW)) + ((DPP_A)*(AuW_A)) + ((DPP_G)*(AuW_G)) \quad 1$$

where, $DPP_A$ is the direction phrase parameter for user configured area;
$DPP_G$ is the direction phrase parameter for other area;
$AuW_A$ is the audio weightage for the user configured area; and
$AuW_G$ is the audio weightage for the other area.

Similarly the combined parameter for video activities (CPV) may be provided as $$CPV = ((VAP)*(VW)) + ((DGP_A)*(VW_A)) + ((DGP_G)*(VW_G)) \quad 2$$

where, $DGP_A$ is the direction phrase parameter for user configured area;
$DGP_G$ is the direction phrase parameter for other area;
$VW_A$ is the audio weightage for the user configured area; and
$VW_G$ is the audio weightage for the other area.

Further, Combined Activity Parameter (CAP) of each of the plurality of area is computed and is given by $$CAP = (CPA + CPV)*ArW \quad 3$$

The Interest Index (II) 212 is obtained for each of the plurality of areas which may be exemplarily given by $$II = \frac{CAP}{Time\ parameter * DW} \quad 4$$

Here, the time parameter 211 is a time duration for which the multimedia of identified area of interest is captured. In one embodiment, the time duration is inversely proportional to the II 212 when the VAP and the AAP is lesser than a pre-defined threshold value. Consider a scenario where one or more of the plurality of capturing devices are capturing multi-media from the area of interest based on the II 212. When the VAP and AAP for the area of interest is lesser than the predefined threshold value, then there is a need for lowering the value of II 212 such that multi-media of other area of interest with greater values of VAP and AAP may be captured. The inverse proportionality may be used for lowering the II 212. Greater the time duration of capturing of the area of interest, lower is the II 212 of the area of interest. Thereby, the other area of interest with greater VAP and AAP is identified and multi-media of the identified area of interest are captured. For the other plurality of areas whose multi-media is not captured, the time parameter 211 may be a pre-defined value.

The equation 4 is only an exemplary method for calculating II 212. For example, the time parameter in the denominator of the II 212 calculation is intended only to indicate inverse proportionality and may not necessarily be a division operation. A person skilled in art will understand that any other method for calculating II can be used in the present disclosure.

Similarly, the equations 1, 2, and 3 indicate exemplary methods for calculation of the combined parameters. A person skilled in the art will understand that any other method for calculating the combined parameters can be used in the present disclosure.

The area of interest identifying module 204 identifies the area of interest from the plurality of areas based on the II (212). The II 212 of the identified area of interest is greater than the II 212 of the other plurality of areas. Upon determining the area of interest, the features changing module 205 and the orientation changing module 206 configures the features and the orientation of the plurality of multi-media capturing devices 102 and captures the multi-media 215 of the area of interest. The features may include zooming, focusing and so on. The orientation may include rotation, lateral movements of the multi-media capturing devices 102.

In embodiment of the present disclosure, a face-recognition module is implemented. By performing face recognition of one or more persons in the plurality of areas, famous personalities, celebrities, audiences and presenters may be identified and given a predefined higher 1I 212. By this implementation, the plurality of multi-media capturing devices 102 focus on the recognized persons when long period of inactivity occurs with respect to one or more multi-media parameters 209 derived by analyzing the feeds 208. In one embodiment, the face-recognition module is configured to engross viewers of the captured multi-media. In one embodiment, pre-configured objects may be also detected in the plurality of areas as per one or more multi-media parameters 209.

The other modules 207 may refer to such modules which can be referred for capturing multi-media of an area of interest in plurality of areas using plurality of multi-media capturing devices 102.

The other data 216 may refer to such data which can be referred for capturing multi-media of an area of interest in plurality of areas using plurality of multi-media capturing devices 102.

Figure 3:
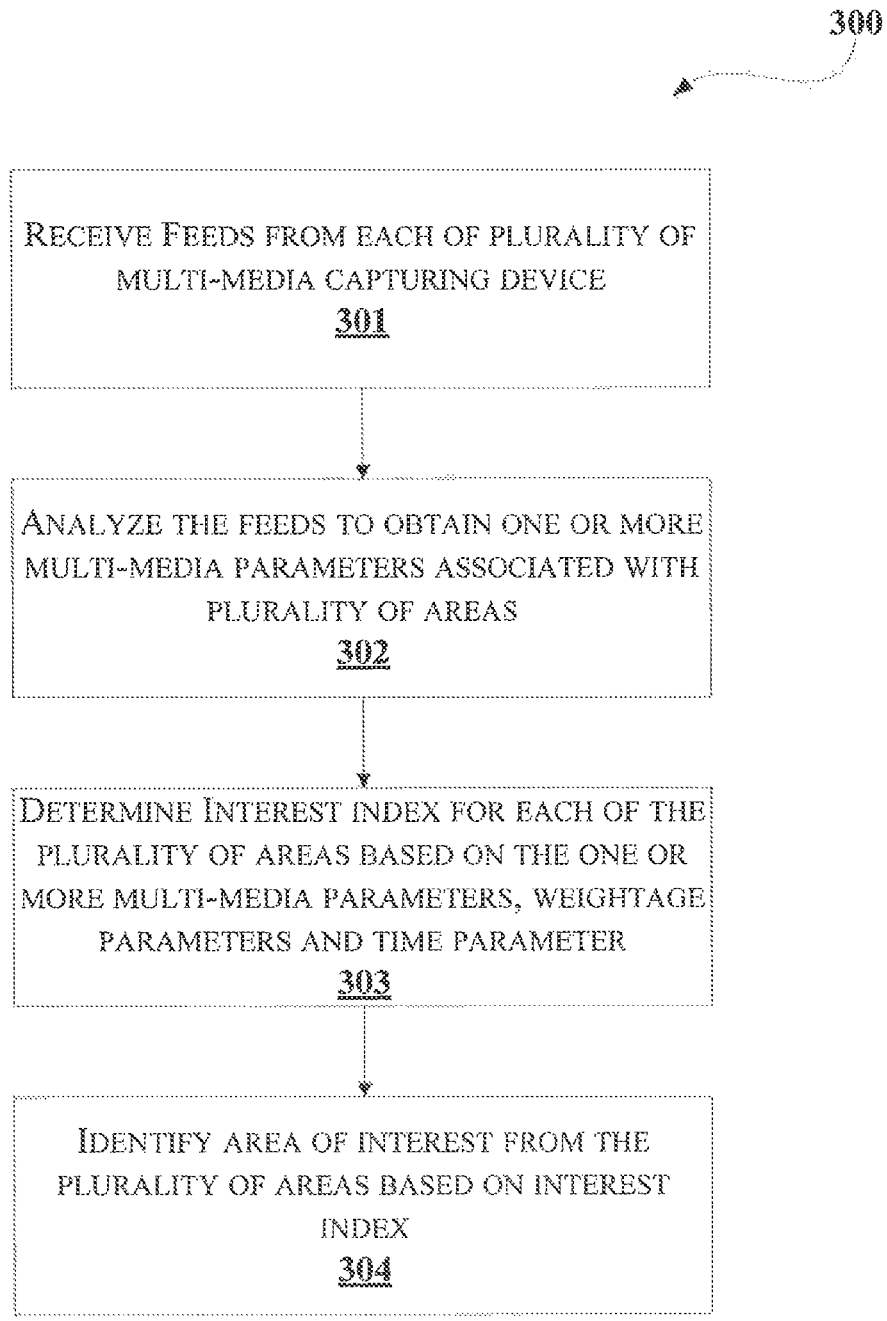
FIG. 3 shows a flowchart illustrating a method for capturing multi-media of an area of interest in plurality of areas using plurality of multi-media capturing devices in accordance with some embodiments of the present disclosure.

FIG. 3 shows a flowchart illustrating a method for capturing multi-media of an area of interest in plurality of areas using plurality of multi-media capturing devices in accordance with some embodiments of the present disclosure.

As illustrated in FIG. 3, the method 300 comprises one or more blocks for capturing multi-media of the area of interest in the plurality of areas using the plurality of multi-media capturing devices 102. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the feeds receiving module 201 in the multi-media capturing control unit 101 receives the feeds 208 from the plurality of multi-media capturing devices 102. The feeds 208 comprise the speech data, gaze data, dynamics data and gesture data.

At block 302, the feeds analyzing module 202 in the multi-media capturing control unit 101 analyses the feeds 208 to obtain the one or more multi-media parameters 209. The one or more multi-media parameters 209 comprises the video activity parameters, the audio activity parameter, the gaze directed parameter, the directional phrase parameter and the directional gesture parameters of each of the plurality of areas.

At block 303, the interest index determining module 203 in the multi-media capturing control unit 101 determines the interest index 212 for each of the plurality of areas based on the one or more multi-media parameters 209, the weightage parameters 210 and the time parameter 211. The weightage parameters 210 comprise the area weightage, the audio weightage, the video weightage and the dynamics weightage of each of the plurality of areas and the weightage parameters are pre-set with corresponding weightage values. The time parameter 211 is the time duration for which the multimedia is captured and the time duration is inversely proportional to the interest index 212 when the video activity parameter and the audio activity parameter are lesser than the pre-defined threshold value. In one embodiment, the time parameter 211 may be a predefined value.

At block 304, the area of interest identifying module 204 in the multi-media capturing control unit 101 identifies the area of interest from the plurality of areas based on the interest index 212. The multi-media of the identified area of interest is captured by the corresponding plurality of multi-media capturing devices 102. The captured multi-media 215 may be displayed on a display unit. In one embodiment, the captured multi-media 215 may be stored in a storage device.

Figure 4:
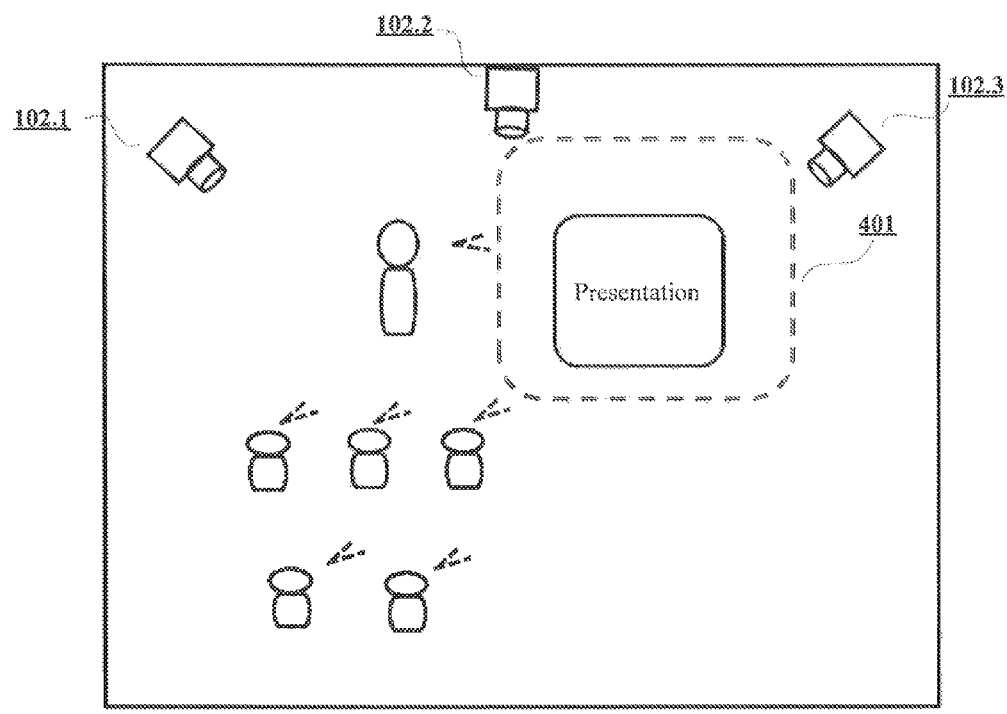
FIGS. 4, 5 and 6 show example scenarios illustrating multi-media capturing of an area of interest in accordance with some embodiments of the present disclosure.
Figure 5:
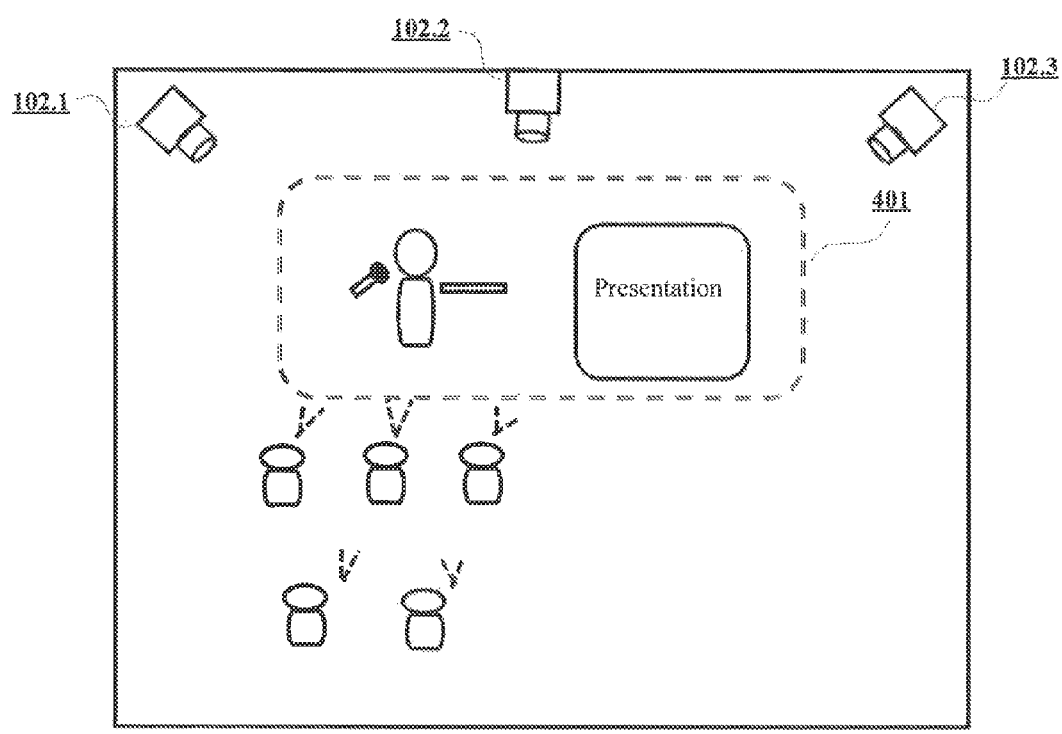
Figure 6:
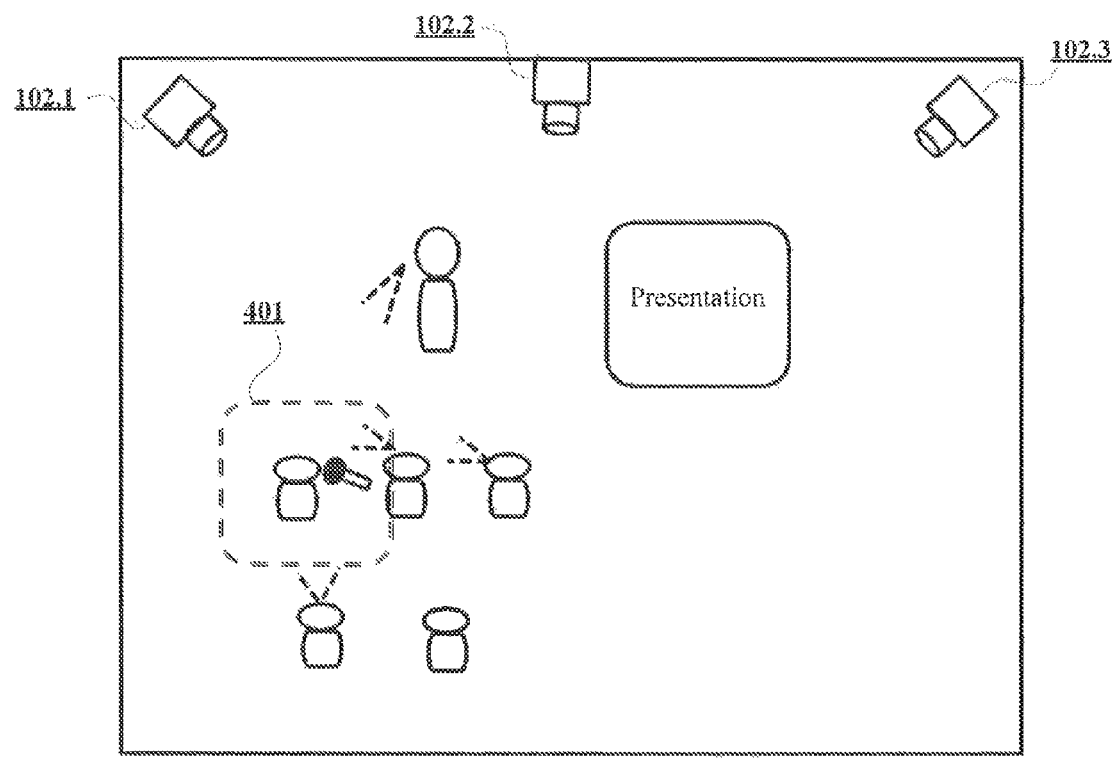

FIGS. 4, 5 and 6 show example scenarios illustrating multi-media capturing of an area of interest in accordance with some embodiments of the present disclosure.

Consider a scenario where a presentation is presented by a presenter in an area with audience seated in front of a presentation dais, viewing the presentation screen.

As per the scenario in FIG. 4, the presenter's gaze and the audience gaze direction is detected to be towards the presentation screen.

Below tables provides an example illustration of pre-setting the weightage values, obtaining the one or more multi-media parameters and determining II 211 for identifying the area of interest. Consider the plurality of areas to be presentation dais, presentation screen and the audience area.

TABLE 1 illustrating pre-setting of the weightage parameters.

| Weightage Parameter | Presentation Dais | Presentation Screen | Audience Area |
|---|---|---|---|
| ArW | 5 | 3 | 1 |
| AuW | 3 | 2 | 2 |
| VW | 3 | 2 | 1 |
| DW | 1 | 2 | 2 |

TABLE 2 illustrating obtaining of the one or more multi-media parameters.

| Multi-Media Parameter | Presentation Dais | Presentation Screen | Audience Area |
|---|---|---|---|
| VAP | 1 | 3 | 1 |
| AAP | 0 | 3 | 0 |
| GDP(GDP$_A$ + GDP$_G$) | — | 1 + 5 | — |
| DPP | — | — | — |
| DGP | — | — | — |

TABLE 3 illustrating determined combined parameters and II 212 from equations 1, 2, 3 and 4.

| Parameter | Presentation Dais | Presentation Screen | Audience Area |
|---|---|---|---|
| CPA | 0 | (3 * 2) + 0 + 0 | 0 |
| CPV | (1 * 3) + 0 + 0 | (3 * 2) + (1 * 3) + (5 * 1) | (1 * 1) + 0 + 0 |
| CAP | (0 + 3) * 5 | (6 + 14) * 3 | ( 0 + 1) * 1 |
| II | $\dfrac{15}{1*1}$ | $\dfrac{60}{1*2}$ | $\dfrac{1}{1*2}$ |

From, the above illustration, the presentation screen has the highest II. Therefore, based on the gazes directed to Area, VAP, audio signals and ArW of the presentation screen, the presentation area is identified as the area of interest 401.

Similarly for FIG. 5, the presenter's gestures pointing towards the presentation and the gaze direction is detected to be towards the presentation screen and the presenter. Therefore, based on the gaze directed to area, VAP, DGP, audio signals and ArW of the presentation dais, the presentation dais is identified as the area of interest 401. For FIG. 6, the gaze direction is detected to be towards one of the person in the audience area. Therefore, based on the gaze directed to area, VAP, audio signals, area surrounding one of the audience is identified as the area of interest 401.

Computer System

Figure 7:
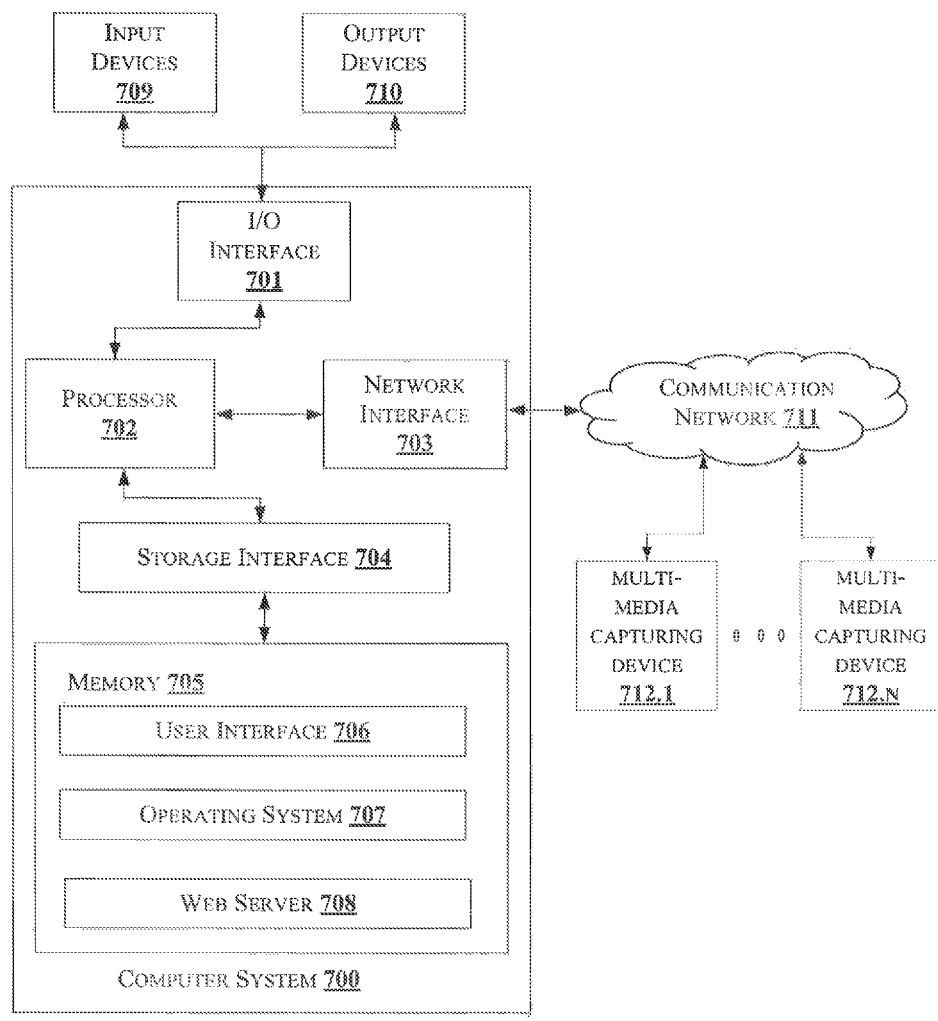
FIG. 7 is a block diagram of an exemplary computer system for implementing some embodiments consistent with the present disclosure.

FIG. 7 is a block diagram of an exemplary computer system for implementing some embodiments consistent with the present disclosure.

In an embodiment, the computer system 700 is used to implement the multi-media capturing control unit 101. The computer system 700 may comprise a central processing unit ("CPU" or "processor") 702. The processor 702 may comprise at least one data processor for executing program components for managing the performance of at least one instrumentation device deployed across one or more sites. The processor 702 may include specialized processing units such as integrated system (bus) controllers, memory management control units, floating point units, graphics processing units, digital signal processing units, etc.

The processor 702 may be disposed in communication with one or more input/output (I/O) devices (not shown) via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices. For example, the input device 703 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 710 may be a printer, fax machine, video display (e.g., cathode ray tube (CRT), liquid crystal display (LCD), light-emitting diode (LED), plasma, Plasma display panel (PDP), Organic light-emitting diode display (OLED)) or the like), audio speaker, etc.

In some embodiments, the computer system 700 is connected to the plurality of multi-media capturing devices 712.1-712.N (hereafter referred to as the plurality of multi-media capturing devices 712) through a communication network 711. In one embodiment, the computer system 700 may be in the plurality of multi-media capturing devices. The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 709 may include, without limitation, a direct interconnection, local area network (LAN), wide area network (WAN), wireless network (e.g., using Wireless Application Protocol), the Internet, etc. Using the network interface 703 and the communication network 711, the computer system 700 may communicate with the plurality of multi-media capturing devices 712. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 709 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 702 may be disposed in communication with a memory 705 (e.g., RAM, ROM, etc. not shown in FIG. 7) via a storage interface 704. The storage interface 704 may connect to the memory 705 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web server 708 etc. In some embodiments, computer system 700 may store user/application data (not shown in figure), such as the data, variables, records, etc. as described in this disclosure. Such databases may be implemented as fault-tolerant, relational, scalable, secure databases such as Oracle or Sybase.

The operating system 707 may facilitate resource management and operation of the computer system 700. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 700 may implement a web browser 708 stored program component. The web browser 708 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX, DHTML, Adobe Flash, JavaScript, Java, Application Programming Interfaces (APIs), etc. In some embodiments, the computer system 700 may implement a mail server stored program component. The mail server may be an Internet mail server such as Microsoft Exchange, or the like. The mail server may utilize facilities such as ASP, ActiveX, ANSI C++/C#, Microsoft.NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 700 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory.

Examples include Random Access Memory (RAM), Read-Only Memory (ROM), volatile memory, nonvolatile memory, hard drives, CD ROMs, DVDs, flash drives, disks, and any other known physical storage media.

Embodiments of the present disclosure disclose an efficient automated system for capturing multi-media of an area of interest from plurality of areas.

Embodiments of the present disclosure control the plurality of multi-media capturing devices intelligently by obtaining feeds from the multi-media capturing devices.

Embodiments of the present disclosure automatically selects camera orientation and camera features such as focus, zoom level and so on for capturing the multi-media of the area of interest.

Embodiments of the present disclosure disclose a method for capturing multi-media from an area of interest by eliminating user intervention for operating the multi-media capturing devices.

Embodiments of the present disclosure implement a method for capturing multi-media of important areas from plurality of areas at right time.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 101 | Multi-media Capturing Control Unit |
| 102.1 - - - 102.N | Multi-Media Capturing Devices |
| 103 | Communication Network |
| 104 | Processor |
| 105 | I/O Interface |
| 106 | Modules |
| 107 | Memory |
| 201 | Feeds Receiving Module |
| 202 | Feeds Analyzing Module |
| 203 | Interest Index Determining Module |
| 204 | Area of Interest Identifying Module |
| 205 | Features Changing Module |
| 206 | Orientation Changing Module |
| 207 | Other Modules |
| 208 | Feeds |
| 209 | Multi-media Parameters |
| 210 | Weightage Parameters |
| 211 | Time Parameters |
| 212 | Interest Index |
| 213 | Features Data |
| 214 | Orientation Data |
| 215 | Captured Multi-media |
| 216 | Other Data |
| 700 | Computer System |
| 701 | I/O Interface |
| 702 | Processor |
| 703 | Network Interface |
| 704 | Storage Interface |
| 705 | Memory |
| 706 | User Interface |
| 707 | Operating System |
| 708 | Web Server |
| 709 | Input Devices |
| 710 | Output Devices |
| 711 | Communication Network |
| 712.1 - - - 712.N | Multi-Media Capturing Devices |

We claim:

1. A method for capturing multi-media of an area of interest in plurality of areas using plurality of multi-media capturing devices, comprising:
   receiving, by a multi-media capturing control unit, feeds from each of plurality of multi-media capturing devices, wherein the feeds comprises speech data and at least one of gaze data, dynamics data and gesture data of corresponding plurality of areas;
   analyzing, by a multi-media capturing control unit, the feeds to obtain one or more multi-media parameters associated with the plurality of areas, wherein the one or more multi-media parameters comprises video activity parameter, audio activity parameter, gaze directed parameter, directional phrase parameter and directional gesture parameters of each of the plurality of areas;
   determining, by the multi-media capturing control unit, interest index for each of the plurality of areas based on the one or more multi-media parameters, weightage parameters and time parameter;
   identifying, by the multi-media capturing control unit, an area of interest from the plurality of areas based on the interest index, for capturing multi-media of the area of interest; and
   changing, by the multi-media capturing control unit, one or more features and orientation of the plurality of multi-media capturing devices associated with the identified area of interest based on the interest index.

2. The method as claimed in claim 1, wherein the interest index of the identified area of interest is greater than the interest index of other plurality of areas.

3. The method as claimed in claim 1, wherein the plurality of multi-media capturing devices are at least one of image capturing devices, video capturing devices and audio capturing devices.

4. The method as claimed in claim 1, wherein the weightage parameters comprise area weightage, audio weightage, video weightage and dynamics weightage of each of the plurality of areas, said weightage parameters are pre-set with corresponding weightage values.

5. The method as claimed in claim 1, wherein the time parameter is a time duration for which the multimedia of identified area of interest is captured, wherein the time duration is inversely proportional to the interest index when the video activity parameter and the audio activity parameter is lesser than a pre-defined threshold value.

6. The method as claimed in claim 1, wherein the time parameter is a pre-defined value.

7. A multi-media capturing control unit for capturing multi-media of an area of interest in plurality of areas using plurality of multi-media capturing devices, comprises:
   a processor; and
   a memory communicatively coupled to the processor, wherein the memory stores processor-executable instructions, which, on execution, cause the processor to:
   receive feeds from each of plurality of multi-media capturing devices, wherein the feeds comprises speech data and at least one of gaze data, dynamics data and gesture data of corresponding plurality of areas;
   analyze the feeds to obtain one or more multi-media parameters associated with the plurality of areas, wherein the one or more multi-media parameters comprises video activity parameter, audio activity parameter, gaze directed parameter, directional phrase parameter and directional gesture parameters of each of the plurality of areas;
   determine interest index for each of the plurality of areas of interest based on the one or more multi-media parameters, weightage parameters and time parameter;
   identify an area of interest from the plurality of areas based on the interest index, for capturing multi-media of the area of interest; and
   change one or more features and orientation of the plurality of multi-media capturing devices associated with the identified area of interest based on the interest index.

8. The multi-media capturing control unit as claimed in claim 7, wherein the interest index of the identified area of interest is greater than the interest index of other plurality of areas.

9. The multi-media capturing control unit as claimed in claim 7, wherein the plurality of multi-media capturing devices are at least one of image capturing devices, video capturing devices and audio capturing devices.

10. The multi-media capturing control unit as claimed in claim 7, wherein the weightage parameters comprise area weightage, audio weightage, video weightage and dynamics weightage of each of the plurality of areas, said weightage parameters are pre-set with corresponding weightage values.

11. The multi-media capturing control unit as claimed in claim 7, wherein the time parameter is a time duration for which the multimedia of identified area of interest is captured, wherein the time duration is inversely proportional to the interest index when the video activity parameter and the audio activity parameter is lesser than a pre-defined threshold value.

12. The multi-media capturing control unit as claimed in claim 7, wherein the time parameter is a pre-defined value.

* * * * *